United States Patent [19]
Krishnan et al.

[11] Patent Number: 6,008,280
[45] Date of Patent: Dec. 28, 1999

[54] POLYCARBONATE COMPOSITIONS HAVING GOOD MOLD-RELEASE PROPERTIES

[75] Inventors: Sivaram Krishnan, Pittsburgh; Jon M. Newcome, Aliquippa; James B. Johnson, Washington; Ramesh M. Pisipati, Wexford, all of Pa.; Jeffrey M. Tennant, New Cumberland, W. Va.

[73] Assignee: Bayer Corporation, Pittsburgh, Pa.

[21] Appl. No.: 08/975,477

[22] Filed: Nov. 20, 1997

[51] Int. Cl.$^6$ .................................................. C08K 5/103
[52] U.S. Cl. ............................................................ 524/310
[58] Field of Search ............................................... 524/310

[56] References Cited

U.S. PATENT DOCUMENTS

| | | | |
|---|---|---|---|
| 3,784,595 | 1/1974 | Schirmer et al. | 260/18 TN |
| 3,836,499 | 9/1974 | Schirmer et al. | 260/31.2 R |
| 4,007,150 | 2/1977 | Adelmann et al. | 260/30.8 R |
| 4,131,575 | 12/1978 | Adelmann et al. | 260/17.4 R |
| 4,143,024 | 3/1979 | Adelmann et al. | 260/31.2 X |
| 4,327,007 | 4/1982 | Vanderkool, Jr. et al. | 524/315 |
| 4,446,268 | 5/1984 | Lee | 524/315 |
| 4,670,479 | 6/1987 | Miyauchi | 524/154 |
| 4,839,410 | 6/1989 | Atomori | 524/281 |
| 5,596,034 | 1/1997 | Krishnan et al. | 524/308 |

*Primary Examiner*—David Buttner
*Attorney, Agent, or Firm*—Joseph C. Gil; Aron Preis

[57] ABSTRACT

A thermoplastic molding composition having improved release properties is disclosed. The composition contains a polycarbonate resin and a mold release agent which is a hydroxy ester conforming structurally to

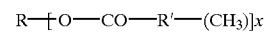

where R is a member selected from the group consisting of glycerol, trimethylol propyl and pentaerythritol radicals, R' denotes a $C_{6-20}$ hydrocarbon radical having at least one pendant hydroxyl group, and x is 2 to 4.

10 Claims, No Drawings

POLYCARBONATE COMPOSITIONS HAVING GOOD MOLD-RELEASE PROPERTIES

FIELD OF THE INVENTION

The invention relates to thermoplastic molding compositions and in particular to compositions based on polycarbonates.

SUMMARY OF THE INVENTION

A thermoplastic molding composition having improved release properties is disclosed. The composition contains a polycarbonate and a mold release agent which is a hydroxy ester conforming structurally to

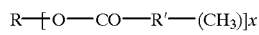

$$R\text{---}[O\text{---}CO\text{---}R'\text{---}(CH_3)]x$$

where R is a member selected from the group consisting of glycerol, trimethylol propyl and pentaerythritol radicals, R' denotes a $C_{6-20}$ hydrocarbon radical having at least one pendant hydroxyl group, and x is 2 to 4.

BACKGROUND OF THE INVENTION

Polycarbonates are widely used engineering thermoplastics because they feature an attractive set of physical and mechanical properties. A disadvantage is, however, associated with their processing in that they have poor release properties. In an injection molding application, this disadvantage translates to relatively long cycle times. Shorter cycle times have been attained by injection molding at higher temperatures and by using mold release agents. Improving the release properties of polycarbonate compositions by the incorporation of long chain aliphatic carboxylic acid esters of monohydric and trihydric alcohols has been reported in German published Specifications DOS 2,064, 095 and 2,220,185. U.S. Pat. No. 4,007,150 disclosed the use of perfluoroalkane sulfonic acid amides and/or cyclic ammonium salts of such acids as mold release agents. Relevant technology has been disclosed in U.S. Pat. No. 3,784,595 which refers to polycarbonate molding compositions having improved release properties containing an ester of trihydric alcohol and a $C_{10-22}$-saturated aliphatic carboxylic acid. These esters are said to be effective mold release agents, without at the same time causing a measurable quality lowering degradation of the polycarbonate. Also relevant in this context is U.S. Pat. No. 3,836,499 which disclosed esters of monovalent $C_{10-35}$-alcohols and aliphatic saturated $C_{8-25}$-monocarboxylic acids. U.S. Pat. Nos. 4,131, 575 and 4,143,024 disclosed relevant mold release technology entailing polycarbonate compositions and esters of saturated aliphatic carboxylic acid and respectively, 4-hydric to 6-hydric alcohols, and aromatic hydroxy compounds with from 1 to 6 OH groups. Also relevant is U.S. Pat. No. 4,446,268 which disclosed an asymmetric carboxylic acid ester having a long chain alcohol component said to have effective mold releasing properties in several thermoplastic resins, including polycarbonates. U.S. Pat. No. 4,670,479 disclosed a polycarbonate composition containing a partial ester of a monobasic fatty acid having 10 to 22 carbon atoms with a polyhydric alcohol having 2 to 10 carbon atoms. U.S. Pat. No. 4,327,007 disclosed a polyethylene terephthalate composition which contains an ester plasticizer of an aliphatic carboxylic acid having a carboxyl group and an alcohol having one hydroxyl group. Lastly, a modified hydrogenated castor oil has been reported in U.S. Pat. No. 5,596,034 to have good release properties in polycarbonates.

DETAILED DESCRIPTION OF THE INVENTION

Aromatic polycarbonates within the scope of the present invention include homopolycarbonates and copolycarbonates and mixtures thereof.

The suitable polycarbonates have a weight average molecular weight of 10,000 to 200,000, preferably 12,000 to 80,000 and their melt flow rate, per ASTM D-1238 at 300° C., is about 1 to about 100 g/10 min., preferably about 3 to 90 g/10 min. In an embodiment of the invention directed to optical applications, including optical disc applications, the polycarbonate resin has a viscosity average molecular weight of about 12,000 to 20,000 g/mole, corresponding approximately to a melt flow rate of about 90 to 50 g/10 min. Naturally, in these applications the composition is characterized in its high light transmittance—determined in accordance with ASTM protocol- which is typically greater than 88%. The polycarbonates may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

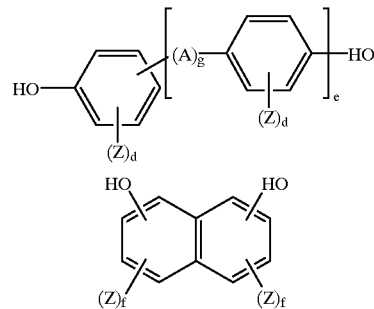

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, or —SO$_2$—or a radical conforming to

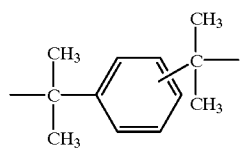

e and g both denote the number 0 to 1; Z denotes F, Cl, Br or $C_{1-4}$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,126,428; 5,104,723; 5,041,521; 5,034,457; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy- benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds.

Polycarbonates of this type have been described, for example, in German Offenlegungsschriften 1,570,533; 2,116,974 and 2,113,374; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-iso-propylidine)-phenol; 2,6-bis-(2'-dihydroxy-5'-methylbenzyl) 4-methyl-phenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon 2000, Makrolon 2200, Makrolon 2400, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 50 to 100, 30 to 45, 16.5 to 24, 13 to 16, 7.5 to 13.0 and 3.5 to 6.5 g/10 min., respectively. These are products of Bayer Corporation of Pittsburgh, Pa.

Polycarbonate resins suitable in the practice of the invention are known and their structures and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The mold release agent in the present context is a hydroxy ester conforming structurally to

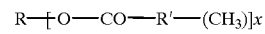

$$R\text{—}[O\text{—}CO\text{—}R'\text{—}(CH_3)]x$$

where R is a member selected from the group consisting of glyceryl, trimethylol propyl and pentaerythrityl radicals, R' denotes a $C_{6-20}$ hydrocarbon radical having at least one pendant hydroxyl group, and x is 2 to 4. Suitable hydroxy esters may be obtained commercially as hydrogenated castor oil. A suitable hydroxy ester conforming to

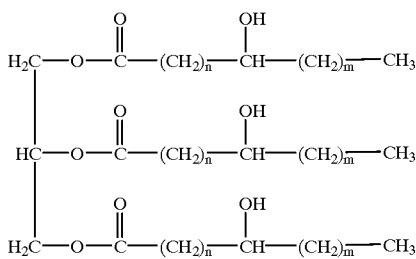

Where n is about 10 and m is 5.

The amount of the mold release agent to be added to the carbonate polymer is a positive amount which is sufficient to impart to the composition improved mold release property, the improvement determined in comparison to a corresponding composition which does not contain the inventive agent. Preferably, the composition of the invention contains about 0.01 to 2, most preferably 0.01 to 1 percent of the mold release agent, said percent being relative to the weight of the polycarbonate.

The incorporation of the release agent into the polycarbonate follows standard techniques, including tumble blending the release agent with the polycarbonate pellets followed by extruding (at about 280–300° C.) to form a strand which is then pelletized.

Suitable methods for the determination of release force for the purpose of comparing the efficiencies of mold release agents are well known. Essentially, the injection cylinder of an injection molding machine, for instance a 4 oz. Newbury, is equipped with a pressure transducer to measure and record the force during the ejection phase of molding a 90 mm diameter flat disc. The mold is characterized in that it has four intersecting 5 mm high by 1 to 2 mm thick tapered ribs laid out in a grid pattern. There are 4 ejector pins at the intersections of the ribs and 4 ejector pins along the perimeter of the disc. The mold is designed with minimum draft on the ribs to promote the tendency of the part to stick to the core. The moldings are injected at a melt temperature of 280° C. with a cycle time of 45 seconds between injections. The mold is maintained at a set point temperature of 79.5° C. The release force values reported below represent averages of the last 12 consecutive mold ejection hydraulic pressure values taken after the mold has stabilized, usually after 25 to 30 ejections.

Compositions in accordance with the invention may be made to incorporate any of the additives, fillers and/or reinforcing agents which are well known in the polycarbonate art. Mention may be made here of the flame retarding agents, stabilizers against the harmful effects of exposure to UV, or gamma radiation; hydrolysis and thermal stabilizers; dyes and pigments.

The invention is further illustrated but is not intended to be limited by the following examples in which all parts and percentages are by weight unless otherwise specified.

Experimental

Compositions in accordance with the invention have been prepared and their properties were determined. A homopolycarbonate of bisphenol-A, having a melt flow rate of about 85 g/10 min, (in accordance with ASTM D-1238) a product of Bayer Corporation was used in preparing the compositions described below. The preparation of the compositions and the molding of the test specimens follows conventional procedures.

The table below enables a comparison between the inventive composition (Example 3) containing a hydroxy ester conforming to

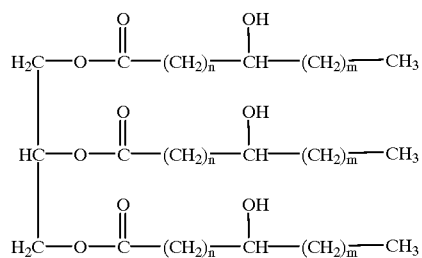

where n is 10 and m is 5, and a corresponding composition (Example 2) which contains glycerol monostearate conforming structurally to

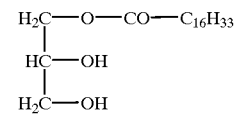

a known release agent for polycarbonate compositions, both compositions containing equal amounts of release agents. Also included are the properties of a composition containing no release agent (Example 1). The content of release agent in the compositions of examples 2 and 3 was 0.05% relative to the weight of polycarbonate. The compositions were pelletized and then injection molded to produce compact discs.

TABLE 1

|  | Example 1 | Example 2 | Example 3 |
|---|---|---|---|
| melt flow rate[1] | 70.8 | 70.7 | 71.0 |
| melt flow rate[2] | 71.0 | 89.0 | 71.6 |
| release characteristics[3] | poor | good | good |
| mold plate-out[3] | very low | severe | very low |
| reactivity with the polycarbonate[4] | — | yes | no |
| thermal stability[5] | light yellow | brown | light yellow |

[1]melt flow of the pellets per ASTM D-1238, g/10 min.
[2]melt flow of the molded article
[3]assessed in reference to molding 3000 articles at cycle time of 4 seconds
[4]gas chromatography analysis after derivatization of hydroxy functionalities in the release agent
[5]color of the molded article after the resin had been held in the barrel of the molding machine at 365 C. for 300 minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising carbonate polymer resin and a hydroxy ester in an amount of about 0.01 to 2 percent relative to the weight of said polymer, said hydroxy ester conforming structurally to

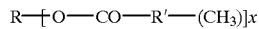

where R is a member selected from the group consisting of glycerol, trimethylol propyl and pentaerythritol radicals, R' denotes a $C_{6-20}$ hydrocarbon radical having at least one pendant hydroxyl group, and x is 2 to 4.

2. The thermoplastic molding composition of claim 1 wherein said resin is a homopolycarbonate based on bisphenol-A.

3. A molded article comprising the composition of claim 1 characterized in that its ASTM-measured transmittance is greater than 88%.

4. The composition of claim 1 wherein said effective amount is about 0.01 to 1 percent relative to the weight of said polymer.

5. The composition of claim 1 wherein said hydroxy ester conforms to

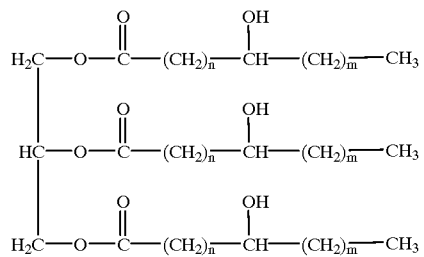

where n is 10 and m is 5.

6. The composition of claim 1 wherein said hydroxy ester is a hydrogenated castor oil.

7. The composition of claim 1 wherein said R is a glyceryl radical.

8. The composition of claim 1 wherein said R is a trimethylol propyl radical.

9. The composition of claim 1 wherein said R is a pentaerythrityl radical.

10. The composition of claim 1 wherein said resin is characterized in that its melt flow rate in accordance with ASTM D 1238 is about 60 to 85 g/10 min.

* * * * *